(12) United States Patent
Bhagat et al.

(10) Patent No.: US 10,898,898 B2
(45) Date of Patent: Jan. 26, 2021

(54) MULTI-STAGE TARGET CELL ENRICHMENT USING A MICROFLUIDIC DEVICE

(71) Applicant: CLEARBRIDGE BIOMEDICS PTE LTD, Singapore (SG)

(72) Inventors: Ali Asgar S. Bhagat, Singapore (SG); Guofeng Guan, Singapore (SG)

(73) Assignee: CLEARBRIDGE BIOMEDICS PTE LTD, Singapore (SG)

( * ) Notice: Subject to any disclaimer, the term of this patent is extended or adjusted under 35 U.S.C. 154(b) by 0 days.

(21) Appl. No.: 16/071,146

(22) PCT Filed: Jan. 28, 2016

(86) PCT No.: PCT/SG2016/050040
§ 371 (c)(1),
(2) Date: Jul. 19, 2018

(87) PCT Pub. No.: WO2017/131580
PCT Pub. Date: Aug. 3, 2017

(65) Prior Publication Data
US 2019/0344273 A1 Nov. 14, 2019

(51) Int. Cl.
*B01L 3/00* (2006.01)
*G01N 15/10* (2006.01)

(52) U.S. Cl.
CPC .... *B01L 3/502761* (2013.01); *G01N 15/1056* (2013.01); *B01L 2200/0652* (2013.01); *B01L 2300/088* (2013.01); *B01L 2300/0816* (2013.01); *B01L 2300/0883* (2013.01); *G01N 2015/1081* (2013.01); *G01N 2015/1087* (2013.01)

(58) Field of Classification Search
CPC ....... B01L 3/502761; B01L 2200/0652; B01L 2300/0816; B01L 2300/088; B01L 2300/0883; G01N 15/1056; G01N 2015/1081; G01N 2015/1087
See application file for complete search history.

(56) References Cited

U.S. PATENT DOCUMENTS

| 7,999,937 B1* | 8/2011 | Srivastava | B01L 3/502761 356/338 |
| 2008/0128331 A1* | 6/2008 | Lean | B01L 3/502776 209/155 |
| 2009/0014360 A1* | 1/2009 | Toner | B01D 45/12 209/208 |

(Continued)

FOREIGN PATENT DOCUMENTS

| EP | 1 942 329 A2 | 7/2008 | |
| WO | WO 2015057159 A1 | 4/2015 | |
| WO | WO-2019153032 A1 * | 8/2019 | ......... G01N 33/5044 |

OTHER PUBLICATIONS

Nicholette Zeliadt, "Capturing Cancer Cells on the Move" Apr. 1, 2014 The Scientist Magazine (Year: 2014).*

(Continued)

*Primary Examiner* — Samuel P Siefke
*Assistant Examiner* — Quocan B Vo
(74) *Attorney, Agent, or Firm* — McDonnell Boehnen Hulbert & Berghoff LLP

(57) ABSTRACT

A microfluidic device and multi-stage target cell enrichment using the microfluidic device are disclosed herewith.

11 Claims, 4 Drawing Sheets

(56) References Cited

U.S. PATENT DOCUMENTS

| | | | |
|---|---|---|---|
| 2009/0114607 A1* | 5/2009 | Lean | B01D 21/265 210/779 |
| 2010/0314323 A1* | 12/2010 | Lean | C12N 1/02 210/703 |
| 2010/0314327 A1* | 12/2010 | Lean | C02F 9/00 210/738 |
| 2011/0076754 A1 | 3/2011 | Frey et al. | |
| 2011/0315228 A1* | 12/2011 | Yokota | B01F 5/0644 137/1 |
| 2012/0252138 A1* | 10/2012 | Sasso, Jr. | G01N 33/54366 436/501 |
| 2012/0328488 A1* | 12/2012 | Puntambekar | B01L 3/50273 422/503 |
| 2013/0130226 A1* | 5/2013 | Lim | B01L 3/502761 435/2 |
| 2013/0244906 A1* | 9/2013 | Collins | B01L 7/52 506/12 |
| 2015/0238963 A1* | 8/2015 | Han | B01F 5/0606 435/30 |
| 2016/0303565 A1* | 10/2016 | Bhagat | G01N 15/0255 |
| 2017/0296732 A1* | 10/2017 | Ebrahimi Warkiani | A61M 1/36 |
| 2018/0185845 A1* | 7/2018 | Bridle | B01L 3/502776 |

OTHER PUBLICATIONS

Hou et al. "Isolation and retrieval of circulating tumor cells using centrifugal forces" Feb. 12, 2013 Sci. Rep. 3, 1259 (Year: 2013).*
Vickers et al. "Separation of two phenotypically similar cell types via a single common marker in microfluidic channels" Lab Chip, 2012, 12, 3399-3407 (Year: 2012).*
Sprenger et al. "Simulation and experimental determination of the online separation of blood components with the help of microfluidic cascading spirals" Biomicrofluidics 9, 044110 (2015) (Year: 2015).*
Green et al. "Microfluidic enrichment of a target cell type from a heterogenous suspension by adhesion-based negative selection" Lab Chip, 2009, 9, 2245-2248 (Year: 2009).*
International Search Report for International application No. PCT/SG2016/050040 dated Mar. 21, 2016.
International Preliminary Report on Patentability for International application No. PCT/SG2016/050040 dated Nov. 7, 2016.
Written Opinion of the International Search Authority for International application No. PCT/SG2016/050040 dated Mar. 21, 2016.
Office Action for Japanese Patent Application No. 2018-533164 dated Oct. 3, 2019.
Office Action for Japanese Patent Application No. 2018-533164 dated May 25, 2020.

* cited by examiner

-- Prior Art --

MULTI-STAGE TARGET CELL ENRICHMENT USING A MICROFLUIDIC DEVICE

This application is a U.S. National Phase application under 35 U.S.C. § 371 of PCT/SG20 16/050040, filed Jan. 28, 2016, the specifications of which is hereby incorporated by reference in its entirety.

FIELD OF THE INVENTION

Embodiments of the present invention relate to microfluidic devices for enrichment of target cells from blood and other bodily fluids using sized based inertial separation.

BACKGROUND

Microfluidic devices such as microfluidics chips typically comprise a set of micro-channels which are etched or molded into a material (for example glass, silicon or polymer such as Polydimethylsiloxane (PDMS)). An application of such microfluidics chips is the enrichment of rare concentrations of relatively large particles/cells from a heterogeneous sample. A typical example is the enrichment of circulating tumor cells (CTCs) from blood cells at very high throughputs. The enrichment of CTCs from patient blood sample is essential for cancer diagnostics and therapy. The challenge is the rarity of CTCs in patient blood sample: CTCs are found in frequencies on the order of 1-10 CTC per mL of whole blood in patients with metastatic disease, while there are several million white blood cells (WBCs), and a billion red blood cells (RBCs) in the same volume of blood.

FIG. 1 shows a schematic of a biochip design described in international patent application PCT/SG2013/000442 (published as WO2015/057159). The microfluidic device 100 comprises a spiral curved microchannel 110. A sample inlet $S_I$ 112 and a sheath buffer inlet $B_I$ 114 are located in a central region of the spiral curved microchannel 110. A sample inlet coupling path 116 couples the sample inlet to the spiral curved microchannel 110. A buffer inlet coupling path 118 couples the sheath buffer inlet 114 to the spiral curved microchannel 110. The sample inlet coupling path 116 and the buffer inlet coupling path 118 join at a confluence 120 at an upstream end of the spiral curved microchannel 110. At the downstream end of the spiral curved microchannel 110 there is a bifurcation 120 where the channel splits into a sample outlet coupling path 124 and a waste outlet coupling path. The sample outlet coupling path 124 is connected to a sample outlet $S_O$ 126 and the waste outlet coupling path 128 is connected to a waste outlet $W_O$ 130. The samples are introduced into the spiral curved microchannel 110 from the outer side of the channel curvature. The cells will align to the outer channel wall with the help of sheath buffer. The curved spiral microchannel 110 is configured to separate large cells such as CTCs from smaller cells such as WBCs and RBCs. The dimensions of the curved spiral microchannel 110 are selected so that the smaller cells migrate across the channel under the influence of Dean forces, whereas the large cells are caused to focus and occupy a single equilibrium position. This means that after half of the Dean cycle both large and small cells will occupy the inner side of the channel. The length to the end of the curved section is selected so that the smaller cells will have completed one Dean cycle. Thus, at the end of the curved section, the smaller cells have finished one Dean cycle and will have migrated to the outer side of the channel. Therefore at the bifurcation 122, the larger CTCs will are focussed at the inner channel wall and are collected from the sample outlet 126 whereas the smaller cells are in a separate stream at the outer channel wall and exit from the waste outlet 130.

The microfluidic chip described in PCT/SG2013/000442 can remove 99.99% of white blood cells from target CTCs from a 1.5× concentrated RBC depleted blood solution, driven at 0.25 mL/min. It means that if we process 7.5 mL of original blood sample, we can retrieve CTCs with thousands of WBCs contamination. Although these WBCs are smaller in size, the cells are collected in the CTC channel due to steric interactions caused by the high cellular burden at the input. While this is an ideal scenario, the condition becomes more complex in clinical sample. The total number of WBCs might increase dramatically after chemotherapy; the occurrence probability of blood clot may also increase for late stage cancer patient. There is also very high requirement on the accuracy and stability of the pumping system for processing the sample through the chip. The contamination of WBCs thus may increase to tens of thousands after single-stage separation using spiral microfluidic chip. This contamination from WBCs can limit downstream analysis (e.g. fluorescent in-situ hybridization (FISH), polymerase chain reaction (PCR) or next generation sequencing (NGS) of these rare target cells due to low signal to noise.

SUMMARY OF THE INVENTION

According to a first aspect of the present invention there is provided a microfluidic device. The microfluidic device comprises at least one inlet for receiving a sample comprising target cells and non-target cells; a first spiral channel portion having an upstream end in a central region and a downstream end in a peripheral region, the upstream end being coupled to the inlet, the first spiral channel portion being configured such that the target cells and the non-target cells occupy different streams at the downstream end; a first waste outlet arranged to couple with streams of non-target cells at the downstream end of the first spiral channel portion; a link channel portion arranged to couple with streams of target cells at the downstream end of the first spiral channel portion; a second spiral channel portion having an upstream end in a peripheral region and a downstream end in a central region, the upstream end of the second channel portion being coupled to the link channel portion, the second spiral channel portion being configured such that the target cells and the non-target cells occupy different streams at the downstream end; a second waste outlet arranged to couple with streams of non-target cells at the downstream end of the second spiral channel portion; and a sample outlet arranged to couple with streams of target cells at the downstream end of the second spiral channel portion.

The microfluidic device comprises two stages each having a spiral channel portion. After the sample, such as a blood sample, has passed through the 1st stage spiral channel, the bulk of the WBCs are depleted through the first waste outlet, and the total cells entering the second stage are dramatically lowered. This low concentration eliminates any possibility of steric or cell-cell interaction in the second stage thereby providing a highly enriched CTC sample. Tests with blood samples confirm that the total WBC number can be well controlled within 500 cells per 7.5 mL blood. This translates to a 100,000× enrichment of CTCs over WBCs.

In an embodiment the microfluidic device further comprises a first buffer inlet coupled to the upstream end of the first spiral channel portion, the first buffer inlet configured to receive a sheath buffer and a second buffer inlet coupled to the upstream end of the second spiral channel portion, the second buffer inlet configured to receive a sheath buffer. The first buffer inlet may be arranged to introduce the sheath buffer to the first spiral channel portion adjacent to an inner wall of the first spiral channel portion and the at least one inlet is arranged to introduce the sample to the first spiral channel portion adjacent to an outer wall of the first spiral channel portion.

In an embodiment the microfluidic device further comprises a pressure compensator path coupling the downstream end of the first spiral channel portion to the first waste outlet, the pressure compensator path having a fluid resistance selected to compensate for a fluid resistance of the second spiral channel portion.

The sample may be a blood sample or blood constituents and the target cells may be circulating tumor cells or circulating rare cells such as circulating fetal cells, endothelial cells and stem cells.

In an embodiment the first and second spiral channel portions are configured such that the target cells undergo inertial focusing and the non-target cells migrate in lateral position under the influence of Dean forces.

In an embodiment the target cells have a cell diameter greater than a cell diameter threshold and the non-target cells have a diameter less than the cell diameter threshold.

In an embodiment flow resistances associated with the first waste outlet and the channel link portion are configured according to a flow ratio. Channel widths associated with the first waste outlet and the channel link portion may also be configured according to the flow ratio.

The flow resistances associated with the second waste outlet and the sample outlet may be configured according to the flow ratio. The channel widths associated with the second waste outlet and the sample outlet may also be configured according to the flow ratio.

The flow ratio may be in the range 0.1 to 10.

BRIEF DESCRIPTION OF THE DRAWINGS

In the following, embodiments of the present invention will be described as non-limiting examples with reference to the accompanying drawings in which:

FIG. 4b shows a simplified version of the schematic model shown in FIG. 4a; and

DETAILED DESCRIPTION

Figure 1:
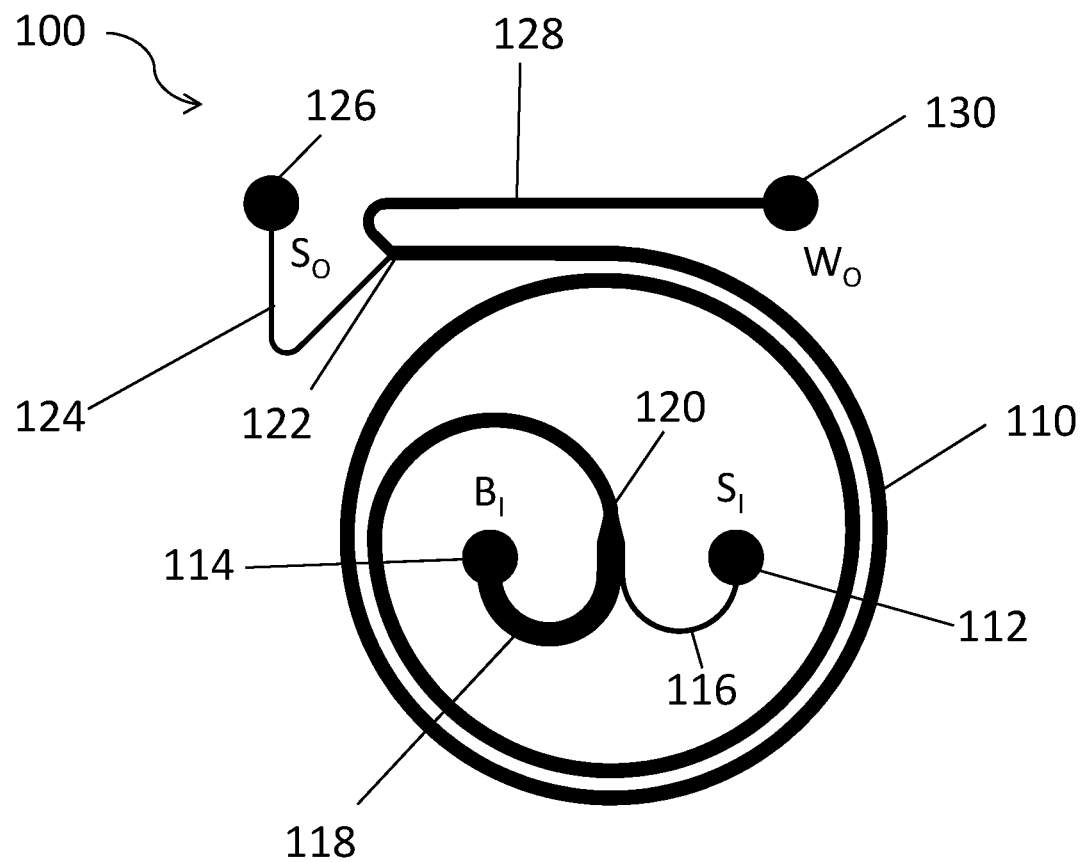
FIG. 1 shows an example of a microfluidic device having a single spiral channel stage.

Embodiments of the present invention relate to microfluidic devices for isolating cells using sized based inertial separation in spiral microchannels. The microfluidic devices may be implemented as a microfluidic chip having a set of microchannels etched or moulded into a material such as glass, silicon or polymer such as Polydimethylsiloxane (PDMS).

Cells flowing in spiral microchannels are subjected to a combination of inertial lift forces along with the centrifugal acceleration induced Dean drag force. The inertial lift forces, which vary with the fourth power of the cell size, are responsible in focusing the cells at distinct multiple equilibrium positions within the microchannel cross-section. Adding a component of Dean drag, by designing spirally shaped microchannels, these multiple equilibrium positions can be reduced to just one near the inner microchannel wall. As the ratio of lift and Dean drag forces varies for varying cell sizes, the cells can be equilibrated at distinct positions along the microchannel cross-section based on their size, with the largest cells equilibrating closest to the microchannel wall. This results in the evolution of distinct streams of cells which can be independently collected by designing appropriate outlets.

Thus, by confining the cells suspension one part of the cross-section at the at least one inlet of the microfluidic device, and ensuring that only the larger cells are influenced by the inertial forces, while the smaller cells are influenced solely by Dean drag forces, high resolution separation can be achieved.

Fluid flowing through a curvilinear channel experiences centrifugal acceleration directed radially outward, leading to the formation of two counter-rotating vortices known as Dean vortices, in the top and bottom halves of the channel. The magnitude of these secondary flows is quantified by a dimensionless parameter, the Dean number (De), given by:

$$D_e = \frac{\rho U_F D_H}{\mu} \sqrt{\frac{D_H}{2R_C}} = R_e \sqrt{\frac{D_H}{2R_C}} \quad (1)$$

where $\rho$ is the fluid density (kg/m$^3$), $U_f$ is the average flow velocity (m/s), $\mu$ is the viscosity of the fluid (kg/ms), $R_c$ is the radius of curvature of the path of the channel (m), $D_H$ is the channel hydraulic diameter (m), and Re is the flow Reynolds number (ratio of inertial to viscous force The flow velocity is adjusted by changing the flow rates or pressure on the pumping module (e.g.: a Syringe pump). Thus, particles flowing in a curvilinear channel experience a drag force due to the presence of these transverse Dean flows, entraining and driving them along the direction of flow within the vortices. This motion translates to the particles moving back and forth along the channel width between the inner and outer walls with increasing downstream distance when visualized from the top or bottom. The velocity with which these cells migrate laterally when flowing in a channel is dependent on the Dean number and can be calculated using:

$$U_{Dean} = k D e^2 \frac{\mu}{\rho D_H} (m/s) \quad (2)$$

where $\rho$ is the fluid density (kg/m$^3$), $\mu$ is the viscosity of the fluid (kg/ms), $D_H$ is the channel hydraulic diameter (m) and k is a scaling factor determined empirically for these curvilinear channels as approximately ~0.01 and verified using COMSOL models of these channels.

The lateral distance traversed by a particle along the Dean vortex can be defined in terms of 'Dean cycle'. For example, a particle which is initially positioned near the microchannel inner wall and migrates to the channel outer wall at a given distance downstream is said to have completed ½ a Dean cycle. Returning back to the original position near the microchannel inner wall completes a full Dean cycle. For a given microchannel length, the particles can thus undergo multiple Dean cycle migration with increasing flow rate (Re) conditions. The length for a complete Dean cycle migration can be calculated as:

$$L_{DC} \sim 2w+h \, (m) \tag{3}$$

where w is the microchannel width (m) and h is the microchannel height (m). Consequently, the total microchannel length required for Dean migration is given by:

$$L_C = \frac{U_f}{U_{Dean}} \times L_{DC} \, (m) \tag{4}$$

It is to be appreciated that the magnitude of Dean drag force is given by the Stokes' law:

$$F_D = 3\pi\mu U_{Dean} a_c \, (N) \tag{5}$$

where $a_c$ is the cell diameter (m).

Apart from the Dean drag force, larger cells with diameter comparable to the microchannel dimensions also experience appreciable inertial lift forces ($F_L$) (both shear and wall-induced) resulting in their focusing and equilibration. The parabolic velocity profile in Poiseuille flow results in a shear-induced inertial lift force $F_{IL}$ acting on the particles directing them away from the microchannel center towards the channel walls. As these particles move closer to the channel wall, the abrupt presence of the wall disrupts the rotational wake formed around the particles inducing a lift-force ($F_{WL}$) directing them away from the wall, towards the microchannel center. As a result of these two opposing lift forces, the particles equilibrate (focus) around the microchannel periphery at distinct and predictable positions. This effect is dominant for particles with size comparable to microchannel dimensions $a_c/h \sim 0.1$. Particularly, the magnitude of the inertial lift force ($F_L$) is given by:

$$F_L = C_L \rho G^2 a_c^4 \, (N) \tag{6}$$

where $C_L$ is the lift coefficient which is a function of the particle position across the channel cross-section assuming an average value of 0.5, and G is the shear rate of the fluid (1/s). The average value of G for a Poiseuille flow is given by $G=U_{max}/D_H$, where, $U_{max}$ is the maximum fluid velocity (m/s) and can be approximated as $2 \times U_F$. Accordingly, the inertial lift force ($F_L$) of equation (6) above can then be re-expressed as:

$$F_L = \frac{2\rho U_F^2 a_c^4}{D_H^2} \, (N) \tag{7}$$

In microchannels with curvilinear geometry, the interplay between the inertial lift force ($F_L$) and the Dean drag force ($F_D$) reduces the equilibrium positions to just two near the inner channel wall, each within the top and bottom Dean vortex. The two equilibrium positions overlay each other along the microchannel height and are located at the same distance from the microchannel inner wall for a given particle size, i.e., viewed as a single position across the microchannel width.

Taking advantage of these two phenomena, i.e. Dean migration and inertial focusing, particles and cell mixtures of varying sizes can then be separated. The dimensions of the microchannel parameters (i.e. width, height, length, radius of curvature and flow rate) are chosen based on the mathematical models afore described to ensure that the larger cells/particles undergo inertial focusing while the smaller cells/particles (below the size cut-off) do not experience the focusing effect. At the inlet the cell/particle mixture is confined near the inner wall of the microchannel, and as the cells/particles move downstream, the smaller particles are transposed to the other half of the channel cross-section under the influence of Dean drag forces. On the other hand, cells/particles above the size cut-off experience strong inertial lift forces and remain focused near the inner channel wall. Thus at the outlet, the smaller cells/particles can be collected from a small cell outlet while the larger cells/particles can be collected from a large cell outlet, thereby achieving separation and isolation. The cut-off of the size can be estimated by the ratio of the two forces (i.e. the inertial lift force ($F_L$) and the Dean drag force ($F_D$)):

$$i_F = F_L/F_D = \frac{85.11 \, R_C a_C^3}{D_H^4} = \frac{85.11 \, R_C a_C^3}{h^4} \tag{8}$$

where $i_F$ is the Force ratio, and the remaining parameters are to be understood as per the foregoing defined in equations (1), (5) and (6). The flow density ($\rho$) and fluid viscosity ($\mu$) refers to the combined density and viscosity. We can adjust either the sheath or sample to adjust the final fluid density and viscosity. According to experimental data obtained, the threshold for $i_F$ is ~2 for inertial focusing of particles/cells. The upper bound for $i_F$ can be >100. For test conditions of $i_F$ less than 2, the particles/cells are only influenced by the Dean drag force and thus circulate with the Dean flow. That is, for the particles/cells to undergo inertial focusing, $i_F$ is to be greater or equal to 2 (i.e. $i_F \geq 2$). It can be seen that the Force ratio, $i_F$, thus acts as a threshold factor to determine whether the particles/cells undergo inertial focusing. From equation (8), it can be seen that $i_F$ is determined by several parameters, such as the radius of curvature, a diameter of the particle/cell (i.e. cell/particle size) as well as the hydraulic diameter.

Among these parameters, the hydraulic diameter and the size of the particle/cell have the most significant effect on determining whether or not a cell/particle experiences inertial focusing. Since low aspect ratio rectangular cross-section channel are to be used for the separation, the channel height h is an important parameter to determine whether a particle/cell with a known diameter can be focused at the side of the channel or will travel along the Dean flow ($D_H$ can be substituted by h in low aspect ratio channels). Accordingly, within the size range of the particle/cell of interest, it is reasonable to select the channel height to be $h<10 \times a_c$ for those particles/cells that are required to be focused at the inner side of the channel.

Following from the above, it is to be highlighted that the work described herein takes advantage of those two phenomena, i.e., Dean migration and inertial focusing, to demonstrate its ability for isolating CTCs from blood. More specifically, a size-based separation method for CTCs separation and isolation from blood in a microfluidic device will be described hereinafter, which works by exploiting the size difference between the CTCs, and the other blood cells (as already mentioned above).

Figure 2A:
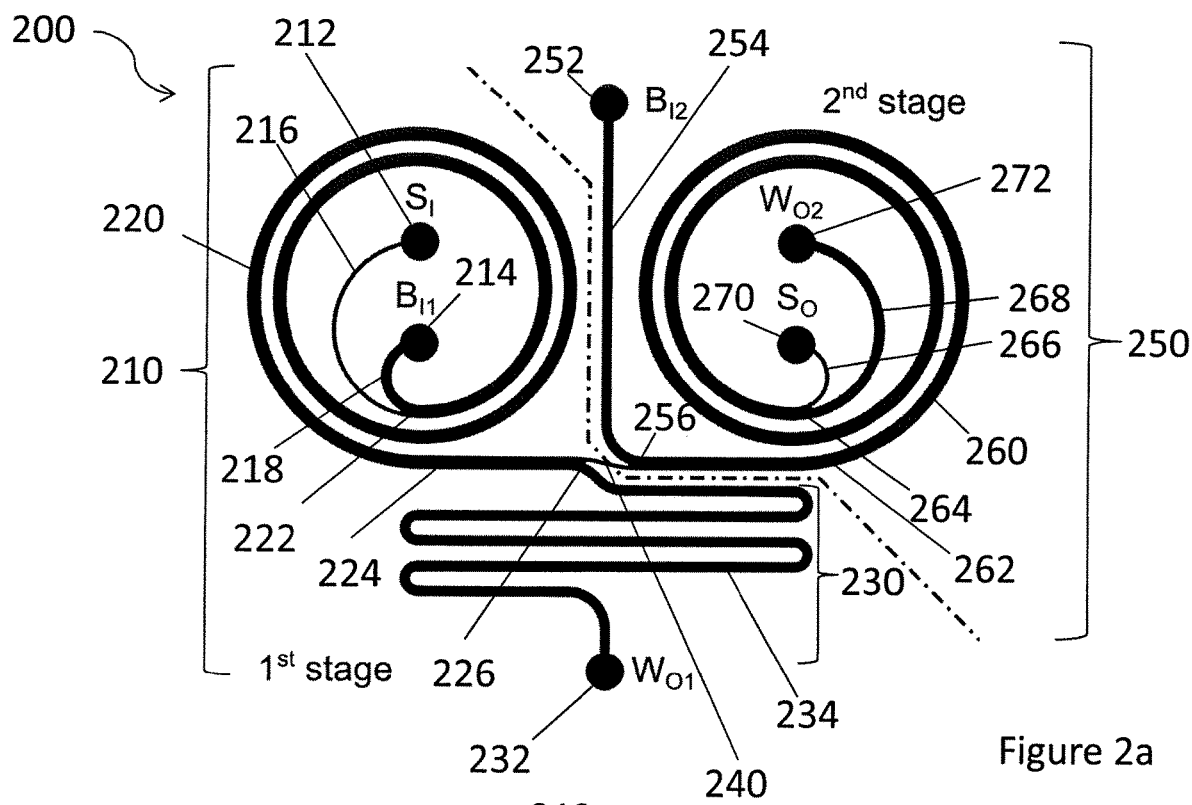
FIGS. 2a and 2b show microfluidic devices according to embodiments of the present invention having two spiral channel stages.

FIG. 2a shows a microfluidic device according to an embodiment of the present invention. The microfluidic device 200 comprises a first spiral microchannel stage 210 and a second spiral microchannel stage 250. The first spiral microchannel stage 210 comprises a first spiral microchannel portion 220. The first spiral microchannel portion 220 follows a spiral path in an anti-clockwise direction, having two approximately circular loops, from an upstream end 222 to a downstream end 224. The upstream end 222 is located in a central region of the first microchannel portion 220. The downstream end 224 is located in a peripheral region of the first microchannel portion. Thus the radius of the first microchannel portion 220 increases from the upstream end 222 to the downstream end 224.

A sample inlet $S_I$ 212 and a first buffer inlet $B_{I1}$ 214 are located in the central region of the first microchannel portion 220. The sample inlet 212 and the first buffer inlet 214 are both coupled to the upstream end 222 of the first spiral microchannel portion 220. A sample inlet coupling path 216 couples the sample inlet 212 to the upstream end 222 of the first microchannel portion 210 and a first buffer inlet coupling path 218 couples the first buffer inlet 214 to the upstream end 222 of the first spiral microchannel portion 220. The sample inlet coupling path 216 is narrower than the first buffer inlet coupling path 218. The upstream end 222 of the first spiral microchannel portion 220 forms a confluence of the sample inlet coupling path 216 and the first buffer inlet coupling path 218. At the confluence the sample inlet coupling path 216 is located on the outside of the first spiral microchannel portion 220 and the first buffer inlet coupling path 218 is located on the inside of the first spiral microchannel portion 220.

The downstream end 224 of the first spiral channel portion 220 is coupled to a bifurcation 226 where the microchannel splits into a link channel portion 240 and a first waste outlet portion 230. The link channel portion 240 couples the first spiral microchannel stage 210 with the second spiral microchannel stage 250. The first waste outlet portion 230 couples the first spiral microchannel stage 210 with a first waste outlet $W_{O1}$ 232. The link channel portion 240 is located on the inner side wall of the downstream end 224 of the first spiral channel portion 220. The first waste outlet portion 230 is located on the outer side wall of the downstream end 224 of the first spiral channel portion 220. The channel width of the channel link portion 240 is less than the channel width of the first waste outlet channel portion 230. The first waste outlet channel portion 230 comprises a plurality of straight sections connected by bends. The straight sections and the bends make up a pressure compensator path 234.

The second spiral microchannel stage 250 comprises a second spiral microchannel portion 260. The second spiral microchannel portion 260 follows a spiral path in an anti-clockwise direction, having two approximately circular loops, from an upstream end 262 to a downstream end 264. The upstream end 262 is located in a peripheral region of the second spiral microchannel portion 260. The downstream end 264 is located in a central region of the second microchannel portion 260. Thus the radius of the second microchannel portion 260 decreases from the upstream end 262 to the downstream end 264.

The second spiral microchannel stage 250 further comprises a second buffer inlet $B_{I2}$ 252 which is coupled to a second buffer inlet coupling path 254. The second buffer inlet coupling path 254 joins the channel link path 240 at a confluence 256. The confluence 256 is coupled to the upstream end 262 of the second spiral microchannel portion 260. At the confluence 256 the channel link path 240 joins at the outer side wall of the second spiral microchannel portion 260 and the second buffer inlet coupling path 254 joins at the inner side wall of the second spiral microchannel portion 260. The channel width of the channel link path 240 is less than the channel width of the second buffer inlet coupling path 254.

The downstream end 264 of the second spiral microchannel portion 260 forms a bifurcation where the channel splits into a sample outlet coupling path 266 and a second waste outlet coupling path 268. The sample outlet coupling path 266 is located on the inner side wall of the second spiral microchannel portion 260 and the second waste outlet coupling path 268 is located on the outer side wall of the second spiral microchannel portion 260. The channel width of the sample outlet coupling path 266 is less than the channel width of the second waste outlet coupling path 266. The sample outlet coupling path 266 couples the second spiral microchannel portion 260 to a sample outlet 270. The second waste outlet coupling path 268 couples the second spiral microchannel portion 260 to a second waste outlet 272.

The use of the microfluidic device 200 to separate target cells from non-target cells in a sample will now be described. The sample may be, for example, a blood sample and the target cells may be CTCs and the non-target cells WBCs and RBCs. The target CTCs have a larger size than the non-target cells, but are present at much lower concentrations.

The sample containing the target cells and non-target cells is introduced into the sample inlet 212, and a sheath buffer is introduced into the first buffer inlet 214. The input pressures of the sample and the sheath buffer are controlled with a pumping system. At the upstream end 222 of the first spiral microchannel portion 220, both the target cells and the non-target cells will be located in close to the outer side wall of the channel because of the locations of the sample inlet coupling path 216 and the first buffer inlet coupling path 218 at the confluence.

As the cells move around the first spiral microchannel portion 220 they will experience a combination of inertial lift forces along with the centrifugal acceleration induced Dean drag force as described above. The dimensions of the first spiral microchannel portion 220 are selected so that the target cells undergo inertial focussing, whereas the smaller non-target cells only experience the Dean drag force. The forces experienced by the cells cause all of the cells to travel from the outer wall towards the inner wall of the first spiral channel portion 220. Since the smaller non-target cells are moving under the influence of the Dean force, once the non-target cells have undergone a full Dean cycle, they will have moved back to a position close to the outer wall. The larger target cells undergo inertial focussing which causes the target cells to reach an equilibrium position close to the inner wall.

Since the length of the first spiral microchannel portion 220 is selected to be the length required for one complete Dean cycle, at the downstream end 224 of the first spiral channel portion 220, the target cells will be in a position close to the inner channel wall, whereas the non-target cells will be close to the outer cell wall.

Therefore, at the bifurcation 226, the target cells will travel into the channel link path 240 and the non-target cells will travel into the first waste outlet portion 230.

The number of non-target cells entering the second spiral microchannel stage 250 will be significantly depleted compared to the number in the sample inlet. The process occurring in the second spiral microchannel stage 250 is similar to that described above, but since the majority of the non-target cells are removed in the first spiral microchannel stage 210, the combination of the two stages can achieve very high enrichment of the target cells.

At the confluence 256, the sample including target cells enriched in the first spiral microchannel stage 210 are combined with a sheath buffer which is input through the second sheath buffer inlet 252. Since the channel link path 240 is located at the outer wall of the second spiral microchannel portion 260, the cells initially occupy a position close to the outer channel wall. In a process similar to that which occurs in the first spiral microchannel stage 210, the target cells experience inertial focussing which causes them to move to an equilibrium position which is close to the inner channel wall. The non-target cells experience a Dean drag force which causes them to initially move towards the inner channel wall. Once the non-target cells have experienced a full Dean cycle, they will have moved back to a position close to the outer channel wall. Thus if the length of the second spiral microchannel portion is selected to correspond to a full Dean cycle, the non-target cells will occupy a position close to the outer channel wall at the upstream end 264 of the second spiral microchannel portion 260. Therefore, remaining non-target cells will enter the second waste outlet coupling path 268, whereas the target cells will enter the sample outlet coupling path 266.

The pressure compensator path 234 of the first waste outlet channel portion 230 is included to account for the channel resistance due to the second spiral microchannel stage 250.

Figure 2B:
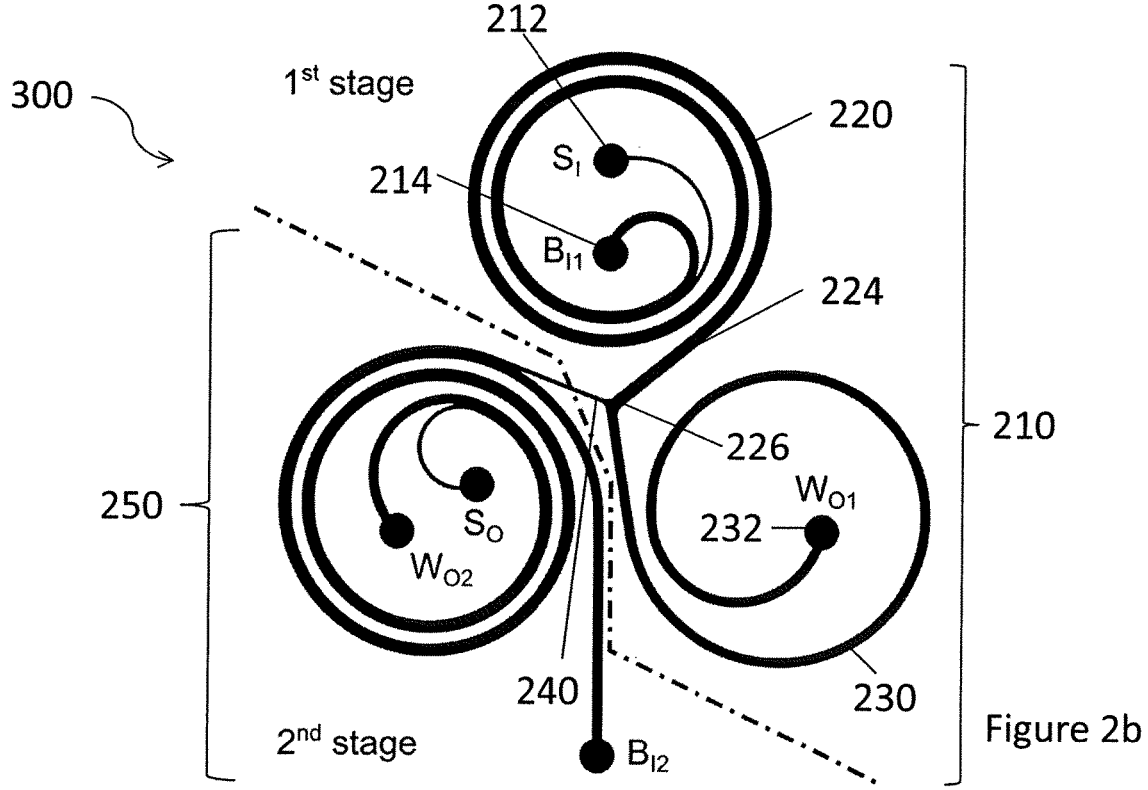

FIG. 2b shows a microfluidic device according to an embodiment of the present invention. The arrangement of the spiral microchannel stages in the microchannel device 300 shown in FIG. 2b differs from the arrangement in the microchannel device 200 shown in FIG. 2a. The same reference numerals are used in FIG. 2b as in FIG. 2a for like features.

The microfluidic device 300 comprises a first spiral microchannel stage 210 and a second spiral microchannel stage 250. In the microfluidic device 300 of FIG. 2b both the first spiral stage microchannel stage 210 and the second microchannel stage 250 have flow in the same rotational direction. The first spiral microchannel stage 210 comprises a first spiral microchannel portion 220 which follows a spiral path in a clockwise direction. As with the microfluidic device 300 shown in FIG. 2a, a sample inlet $S_I$ 212 and a first buffer inlet $B_{I1}$ 214 are located in the central region of the first microchannel portion 220.

The downstream end 224 of the first spiral channel portion 220 is coupled to a bifurcation 226 where the microchannel splits into a link channel portion 240 and a first waste outlet portion 230. The link channel portion 240 couples the first spiral microchannel stage 210 with the second spiral microchannel stage 250. The first waste outlet portion 230 couples the first spiral microchannel stage 210 with a first waste outlet $W_{O1}$ 232. In this embodiment, the first waste outlet portion 230 has a spiral path in an anti-clockwise rotational direction.

The second spiral microchannel stage 250 is as described above with reference to FIG. 2a.

Figure 3:
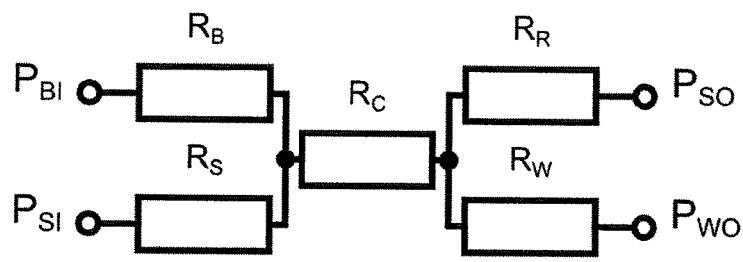
FIG. 3 shows a schematic model of the flow resistances of the microfluidic device shown in FIG. 1.

FIG. 3 shows a schematic diagram of the flow resistances for the microfluidic device shown in FIG. 1. $P_{BI}$, $P_{SI}$, $P_{SO}$, and $P_{WO}$ represent the pressure at buffer inlet 114, sample inlet 112, sample outlet 126, and waste outlet 130 respectively. $R_B$ and $R_S$ represent the flow resistances of the buffer inlet coupling portion 118 and the sample inlet coupling portion 116 respectively. $R_C$ represents the flow resistance of the spiral microchannel portion 110. $R_R$ and $R_W$ represent the flow resistances of the sample outlet coupling portion 234 and the waste outlet coupling portion 128 respectively. The flow resistances of each channel section can be calculated according to Hagen-Poiseuille's law:

$$\Delta P = 128 \, \mu L Q/(\pi d^4) \quad (8.1)$$

where $\Delta P$ is the pressure loss, L is the length of the channel section, $\mu$ is the dynamic viscosity of the fluid, Q is the volumetric flow rate, d is the hydraulic diameter of the channel.

Thus we have the resistance of this channel section $$R = \Delta P/Q = 128 \, \mu L/(\pi d^4) \quad (8.2)$$

is fixed for a given channel.

In single stage design, one of the key factors is the flow rate ratio of recovery (sample outlet) side and waste side, $r_O$. This ratio determines the balance of recovery and enrichment. To calculate this ratio for a given microchannel design we can draw an analogous schematic of flow resistances, as shown in FIG. 3. In our case, we consider a laminar flow of incompressible Newtonian fluid. Here the flow rate ratio $r_O$ can be calculated with Hagen-Poiseuille's law. This model is for the calculation of output ratio of sample over waste, e.g. $r_O = Q_S/Q_W$. Where $Q_S$ and $Q_W$ are the sample output flow and waste output flow respectively. $r_O$ is critical for enrichment factor as it limits the number of contaminating cells collected with target cells. For CTC isolation, for example, the adjustment of $r_O$ could severely affect the recovery and the contamination of the isolation, and is one of the key factors in the design.

Figure 4A:
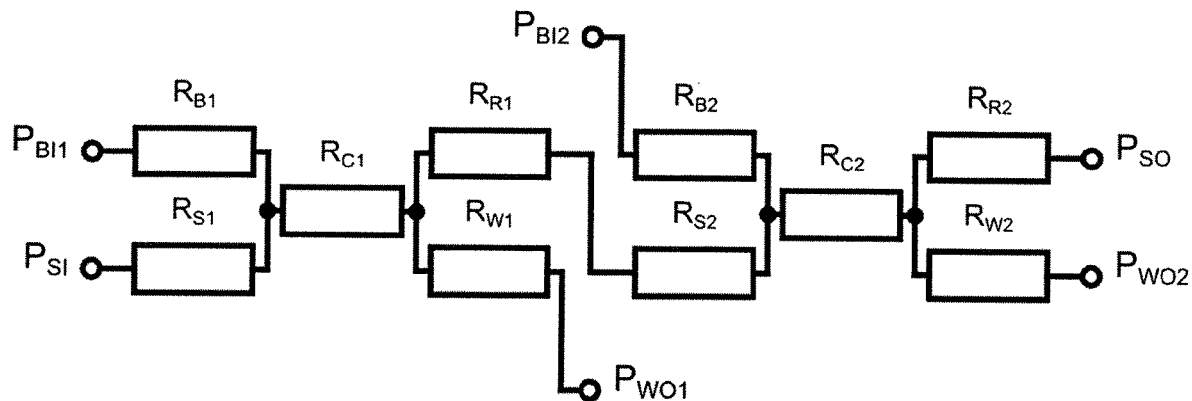
FIG. 4a shows a schematic model of the flow resistances of the microfluidic device shown in FIG. 2a or 2b.

FIG. 4a shows the flow resistance of a two stage microfluidic device such as those shown in FIGS. 2a and 2b. For such a design, it is pertinent to match the resistances between the two stages to ensure proper flow rates as well as efficient enrichment. FIG. 4a is obtained by modelling the two stage design as two single stage systems with the sample output of the first stage connected to the sample input of the second stage. Here it is noted that in FIG. 4a, the channel link path 240 of FIGS. 2a and 2b corresponds to the combination of the sample outlet resistance of the first stage $R_{R1}$ and the sample inlet coupling resistance of the second stage $R_{S2}$. The subscripts 1 or 2 in FIG. 4a indicate the first and second stages respectively.

Figure 4B:
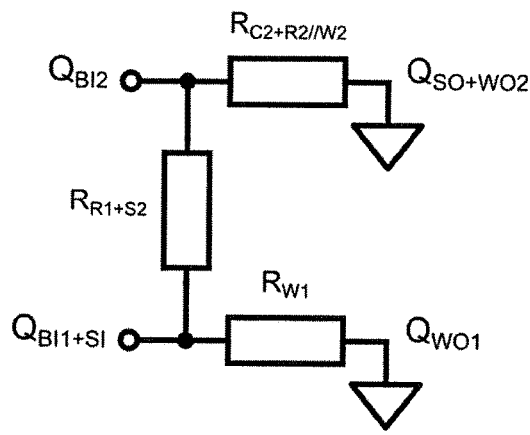

FIG. 4b shows a simplified equilibrium version of the system illustrated in FIG. 4a. In FIG. 4b it is assumed that the out pressures at the first waste outlet ($P_{WO1}$), the second waste outlet ($P_{WO2}$), and the sample outlet ($P_{SO}$) are all equal. In FIG. 4b the flow rates are indicated as follows: $Q_{BI1+S1}$ is the input flow rate of both sample and buffer into the first spiral stage; $Q_{WO1}$ is the flow rate at the waste output of the first stage; $Q_{BI2}$ is the input flow rate of sheath buffer into the second stage; and $Q_{SO+WO2}$ is the output flow rate of the sample output and waste output of the second stage. It is noted that the sample input rate of the second stage $Q_{SI2}$ is equal to the sample output of the first stage since it is the flow through the channel link path 240.

In FIG. 4b, $R_{W1}$ is the flow resistance of the first waste outlet portion 230. $R_{R1+S2}$ is the flow resistance of the channel link path 240. $R_{C2+R2//W2}$ is the flow resistance of the second spiral microchannel portion 260 and the parallel combination of the sample outlet coupling path 266 and the second waste outlet coupling path 268. It is the flow resistances of each of the elements shown in FIG. 4b which must be carefully designed or selected to meet the requirement of outputs as well as the stability of the system.

The design problem of the second stage can be described as:

Given $Q_{BI2}$ and $Q_{BI1+SI}$, calculate $R_{R1+S2}$, $R_{C2+R2//W2}$, and $R_{W1}$, so that:

$$Q_{SO1}/Q_{WO1}=Q_{SI2}/Q_{WO1}=(Q_{BI1+SI}-Q_{WO1})/Q_{WO1}=r_{O1} \quad (9)$$

Here we assume the flow in of $Q_{BI2}$ and $Q_{BI1+SI}$ and flow out of $Q_{SO+WO2}$ and $Q_{WO1}$ are positive.

Following mass conservation and Hagen-Poiseuille's law, we have $$Q_{BI2}=Q_{BI1+SI}=Q_{SO+WO2}+Q_{WO1} \quad (10)$$

By assuming all the outlet pressures are equal, according to equation (8.2) we have the pressure drop after c1 equal in magnitude when the fluid flow through w1 and c2, that is $$Q_{SO+WO2}R_{C2+R2//W2}+Q_{SI2}R_{R1+S2}=\Delta P_{C2+R2//W2}+\Delta P_{R1+S2}=\Delta P_{W1}=Q_{WO1}R_{W1} \quad (11)$$

or $$R_{C2+R2//W2}(R_{W1}-r_{O1}R_{R1+S2})=Q_{WO1}/Q_{SO+WO2} \quad (11.1)$$

From equation (9) and (10) the desired value of $Q_{SO+WO2}$ and $Q_{WO1}$ can be obtained.

By defining $r_O'=r_{O1}+Q_{BI2}/Q_{WO1}=(Q_{BI2}+Q_{SI2})/Q_{WO1}$, we can obtain:

$$r'_O = (Q_{B12} + Q_{S12})/Q_{WO1} \quad (12)$$
$$= Q_{SO+WO2}/Q_{WO1}$$
$$= (R_{W1} - r_{O1}R_{R1+S2})/R_{C2+R2/W2}$$

From equation (12) we know that if two values of flow resistances $R_{C2+R2/W2}$, $R_{W1}$, and $R_{C2+R2//W2}$ are given, the last one can be calculated. The objective of designing these values is to make $r_{O1}$ or $r_O'$ as stable as possible, so we can summarize the guide-line for the entire design of a two-stage chip can thus be given as follows.

Firstly, the main sections are determined, i.e. the length, the radius of curvature, the channel cross section width and height of spiral sections in every stage, to meet the requirement of large particles focussing at the inner side of the channel, while small components will migrate to the outer half of the channel cross section following Dean vortex flow. Generally, to simplify the design of the channels, we can make the spiral sections in each stage share same shape parameters, i.e. the length, the radius of curvature, and the width and height of the channel cross section. Since we want to keep the channel structure of the chip in two dimensions, we can then fix the height of all the channel sections H that equal to the height of the spiral sections.

Then, we can calculate $R_{C1}=R_{C2}=R_C=128 \mu L_c/(\pi d_c^4)$ with Poiseuille's Equation.

To further simplify the design, we can let $r_{O1}=r_{O2}$ and $Q_{BI2}=Q_{WO1}$. So we have $r_O'=r_{O1}+1=r_{O2}+1$. In one embodiment, we collect about 27% of input volume at sample side and 73% at the waste side at each stage, i.e. $r_{O1}=r_{O2}\approx0.37$. A practical range of this output ratio could be 0.1~10 in a real separation experiment.

Then, determine the width of the output sections of the last stage, $W_{R2}$ and $W_{W2}$, so that, $r_{O2}\approx W_{R2}/W_{W2}$, to prevent the generation of turbulence near the bifurcation 264. The length of these sections can be designed according to Poiseuille's Equation that fulfil the requirement of $r_{O2}=Q_{SO2}/Q_{WO2}=R_{WO2}/R_{SO2}$.

Then, calculate the equilibrium flow resistance $R_{C2+R2//W2}=R_{C2}+R_{R2}//R_{W2}$. Here $R_{R2}//R_{W2}$ indicates the combination of resistances in parallel.

The widths of the output sections of the first stage, $W_{R1}$ and $W_{W1}$, can then be determined so that, $r_{O1}\approx W_{R1}/W_{W1}$.

With the limitation of the tolerance of chip fabrication, we know that it is easier to control the accuracy of resistance for wider channel (waste side) than narrower channel (sample side). Thus, though all the three resistance sections in FIG. 4b play important roles in the flow rate distribution, it is advantageous to make the link section of two stages sorter, i.e. $R_{R1+S2}$ as small as possible this corresponds to the channel link section 240 shown in FIGS. 2a and 2b. The length of first waste output can then be calculated accordingly.

The width of the inputs should be designed proportional to the flow rate of each input, respectively, to ensure proper sample distribution at the input.

The input and output ports can then be planned and placed at positions so that the lengths of the sections meet the requirements and none of them are too close to others. Large resistance section should be avoided to reduce the load on the pumping mechanism.

In one example embodiment, the microfluidic device is used for CTC separation. The target is to isolate CTCs (~20 μm) from other blood cells (RBC~8 μm; WBC~10-15 μm, a typical value for the diameter of WBCs is ~12 μm). A two stage design with layout similar to FIG. 2a and 500 μm (width)×175 μm (height)×~2.25 loops channel with 10 mm radius of curvature is used to complete the separation. Since we can achieve high robustness of purity at the last stage, the throughput of this chip could also be higher than single chip. The equivalent throughput of current design is ~340 μL/min RBC lysed whole blood, which can process 7.5 mL of blood sample with 22 minute. The recovery of CTC is >50% and the total WBC number can be controlled within 500, which is suitable for various molecular downstream analyses.

Tables A and B below show a comparison of a single stage chip with a two-stage chip for the recovery of a cancer cell line (H1975 cells) spiked in 7.5 ml blood and resultant impurity level (total leukocyte counts) of a single-stage and 2-stage chip.

TABLE A results from a single stage chip
Single-stage chip

|  | Recovery (%) | Total leukocyte count | Purity (%) |
| --- | --- | --- | --- |
| 1 | 73.80 | 11664 | 1.27 |
| 2 | 50.30 | 11628 | 0.87 |
| 3 | 74.90 | 48312 | 0.31 |
| 4 | 53.40 | 18828 | 0.57 |
| 5 | 53.40 | 14688 | 0.73 |
| 6 | 45.90 | 17028 | 0.54 |
| 7 | 38.70 | 20304 | 0.38 |
| 8 | 46.60 | 12744 | 0.73 |
| 9 | 63.40 | 53352 | 0.24 |
| 10 | 76.00 | 23868 | 0.64 |
| Mean | 57.64 | 23242 | 0.63 |

TABLE B results from a two-stage chip
2-stage chip

|  | Recovery (%) | Total leukocyte count | Purity (%) |
| --- | --- | --- | --- |
| 1 | 51.05 | 86 | 58.45 |
| 2 | 30.37 | 133 | 30.37 |
| 3 | 39.64 | 229 | 27.76 |
| 4 | 32.98 | 233 | 21.02 |
| 5 | 45.83 | 191 | 23.04 |
| 6 | 41.67 | 159 | 25.16 |
| 7 | 51.00 | 307 | 16.61 |
| 8 | 50.00 | 274 | 17.88 |
| 9 | 49.15 | 190 | 15.26 |
| 10 | 46.94 | 197 | 11.68 |
| Mean | 43.86 | 200 | 24.72 |

The tables above shown that a 2-stage chip can achieve almost 100 times more depletion of impurities than a single-stage chip.

There are various factors that may affect the quality of a size based separation with inertial microfluidic technologies. In terms of the enrichment of target cells from impurities, reasons include the quality of sample, cell concentration, the stability and repeatability of pumps, the tolerance of chip fabrication, etc. A small clot of cells can disrupt the flow profile within the microchannel and may direct hundreds/thousands of impurities into the target cell output. Moreover for high concentration samples such as blood samples, steric interactions can also lead to non-target cells entering the target channel output and reducing the enrichment. Pulsation in the pumping strategy can significantly increase the impurities entering the target cells output reducing enrichment factor. A bias of output volume ratio due to fabrication or other issue may lead to a steady flow of impurities to the target cell output further reducing enrichment.

Figure 5:
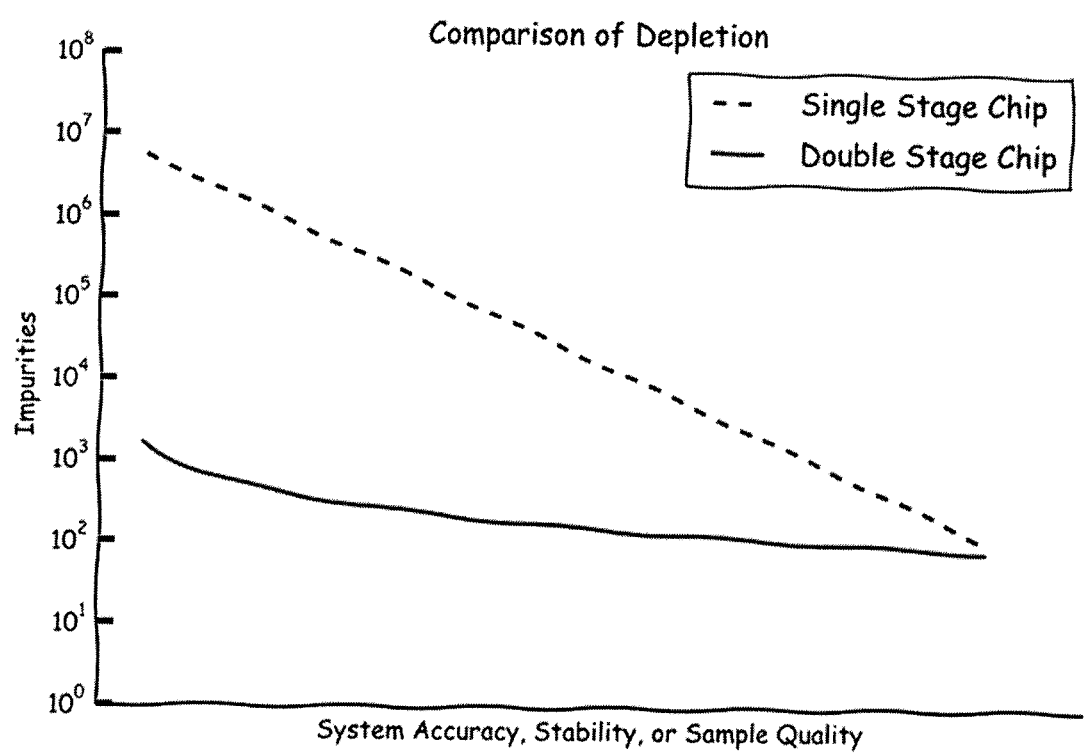
FIG. 5 is a graph schematically showing a comparison of the enrichment achieved by a single stage microfluidic device and a two stage microfluidic device.

FIG. 5 is a schematic graph (not to scale) showing the enrichment (depletion of impurities) using a single-stage chip and a 2-stage chip.

As shown in FIG. 5, there is a dramatic influence on the enrichment of the target cells (depletion of impurities) with flow rate fluctuations, output pressure differences, chip-to-chip fabrication tolerances, and variation of sample quality with single stage chip compared to a 2-stage chip.

Due to the reasons listed above, it is difficult to achieve high enrichment as shown in FIG. 5 from a single-stage spiral microchannel biochip. Using a multi-stage chip design we can minimize the effects from the above mentioned reasons. As the majority of impurities will be removed in the first stage, the cellular burden (load) entering the second stage will be <0.1% of total sample. At such low cell concentrations, effects of sample quality, steric interactions between cells, stability of pumping as well as fabrication tolerances is minimal resulting in higher stability and repeatability as shown in FIG. 5.

Those of skill in the art will appreciate that various modifications and changes in form and details may be made to the embodiments described herein without departing from the scope of the invention defined by the appended claims.

The invention claimed is:

1. A microfluidic device, comprising:
at least one inlet for receiving a sample comprising target cells and non-target cells;
a first spiral channel portion having an upstream end in a central region and a downstream end in a peripheral region, the upstream end being coupled to the inlet, the first spiral channel portion being configured such that the target cells and the non-target cells occupy different streams at the downstream end;
a first waste outlet arranged to couple with streams of non-target cells at the downstream end of the first spiral channel portion;
a link channel portion arranged to couple with streams of target cells at the downstream end of the first spiral channel portion;
a second spiral channel portion having an upstream end in a peripheral region and a downstream end in a central region, the upstream end of the second spiral channel portion being coupled to the link channel portion, the second spiral channel portion being configured such that the target cells and the non-target cells occupy different streams at the downstream end;
a second waste outlet arranged to couple with streams of non-target cells at the downstream end of the second spiral channel portion;
a sample outlet arranged to couple with streams of target cells at the downstream end of the second spiral channel portion;
a first waste outlet portion and a pressure compensator path forming part of the first waste outlet portion and coupling the downstream end of the first spiral channel portion to the first waste outlet;
a sample outlet coupling path coupling the second spiral channel portion to the sample outlet;
a second waste outlet coupling path coupling the second spiral channel portion to the second waste outlet;
a first buffer inlet coupled to the upstream end of the first spiral channel portion, the first buffer inlet configured to receive a sheath buffer; and
a second buffer inlet coupled to the upstream end of the second spiral channel portion, the second buffer inlet configured to receive a sheath buffer,
wherein the pressure compensator path is configured to have a fluid resistance proportionate to a sum of the fluid resistance of the link channel portion and the fluid resistance of the second spiral channel portion and the parallel combination of the sample outlet coupling path and the second waste outlet coupling path;
wherein a channel width of the link channel portion is less than a channel width of the pressure compensator path;
wherein the link channel portion, the first spiral channel portion, and the second spiral channel portion are of equal height; and
wherein a channel width of an entire length of the link channel portion is less than a channel width of the pressure compensator path.

2. The microfluidic device of claim 1, wherein the first buffer inlet is arranged to introduce the sheath buffer to the first spiral channel portion adjacent to an inner wall of the first spiral channel portion and the at least one inlet is arranged to introduce the sample to the first spiral channel portion adjacent to an outer wall of the first spiral channel portion.

3. The microfluidic device of claim 1, wherein the sample is a blood sample or blood constituents.

4. The microfluidic device of claim 1, wherein the target cells are circulating tumor cells or circulating rare cells.

5. The microfluidic device of claim 1, wherein the first and the second spiral channel portions are configured such that the target cells undergo inertial focusing and the non-target cells migrate in lateral position under the influence of Dean forces.

6. The microfluidic device of claim 1, wherein the target cells have a cell diameter greater than a cell diameter threshold and the non-target cells have a diameter less than the cell diameter threshold.

7. The microfluidic device of claim 1, wherein flow resistances associated with the first waste outlet and the link channel portion are configured according to a flow rate ratio.

8. The microfluidic device of claim 7, wherein channel widths associated with the first waste outlet and the link channel portion are configured according to a flow rate ratio.

9. The microfluidic device of claim 7, wherein flow resistances associated with the second waste outlet and the sample outlet are configured according to the flow rate ratio.

10. The microfluidic device of claim 9, wherein channel widths associated with the second waste outlet and the sample outlet are configured according to the flow rate ratio.

11. The microfluidic device of claim 7, wherein the flow rate ratio is in the range of 0.1 to 1.

* * * * *